May 4, 1954 N. M. HAYNES 2,677,727

PORTABLE MAGNETIC TAPE RECORDER

Filed Dec. 20, 1951 4 Sheets-Sheet 1

INVENTOR.
Nathan M. Haynes
BY
D. Stephen Baker
ATTORNEY

May 4, 1954 N. M. HAYNES 2,677,727

PORTABLE MAGNETIC TAPE RECORDER

Filed Dec. 20, 1951 4 Sheets-Sheet 2

INVENTOR.
Nathan M. Haynes
BY
D. Stephen Baker
ATTORNEY

May 4, 1954 N. M. HAYNES 2,677,727

PORTABLE MAGNETIC TAPE RECORDER

Filed Dec. 20, 1951 4 Sheets-Sheet 3

INVENTOR.
Nathan M. Haynes
BY
R. Stepen Baker
ATTORNEY

May 4, 1954 N. M. HAYNES 2,677,727

PORTABLE MAGNETIC TAPE RECORDER

Filed Dec. 20, 1951 4 Sheets-Sheet 4

INVENTOR.
Nathan M. Haynes
BY
D. Stephen Baker
ATTORNEY

Patented May 4, 1954 2,677,727

UNITED STATES PATENT OFFICE 2,677,727

PORTABLE MAGNETIC TAPE RECORDER

Nathan M. Haynes, Queens, N. Y.

Application December 20, 1951, Serial No. 262,513

3 Claims. (Cl. 179—100.2)

This invention relates to magnetic tape recorders and reproducers and more particularly to such an apparatus which is conveniently and completely portable.

A magnetic tape recorder is a precision instrument in that the tape must be driven at constant speeds or the quality of reproduction will be impaired. In fact, an irregularity of $\frac{1}{10}$ of 1 per cent in tape speed can be detected and much more than that, may render the recording defective or perhaps almost unintelligible. Accordingly, most if not all tape recorders which have been produced and sold in the past, have been designed to operate in one position so as to insure the required accuracy of tape speed. The mechanical structure of such apparatus has generally been such that positioning of the instrument in other than the position for which it was designed, disturbed the mechanical operation to such a degree that the tape speed became irregular or its drive even became inoperative.

With the foregoing in mind, I have devised a novel form of portable tape recorder which can operate in any position among other advantages which will appear hereinafter. In fact, the recorder of the instant invention may be operated while it is being carried by a user as during walking so that it may operate even while it is being swung about in the hands of the user.

The recorder of the instant invention is preferably housed in a carrying case which resembles a small travelling case or the like. The case is provided with a handle, and an operating switch is disposed at a selected point so that the switch may be actuated by the user's thumb while his hand is on the handle. The case and enclosed mechanism is such as to enable the recorder to record a conversation or the like while a subject may be unaware that his conversation is being recorded.

In order that the recorder may serve one of its capabilities, i. e., that of recording a conversation without the knowledge of the subject and, in any event to facilitate the operation of the recorder, a microphone is provided in one end of the carrying case. The selection of the particular end of the case to be used for this purpose may be governed by the disposition of the operating switch above mentioned so that a user may hold the case in his right hand, for example, operate the switch with this thumb, and orient the microphone in the direction of the subject all without the subject's knowledge. However, with or without such knowledge, the recorder may serve the desired purpose of effecting a recording while the case thereof is closed and requiring a minimum of attention.

The invention embodies further aspects which are considered to be of major importance. For example, I have devised a single indicating unit which performs three functions. It indicates whether the amplifier is on; it discloses when the tape drive has reached proper operating speed; and it further indicates when the spring motor with which the apparatus is provided, should be rewound. In a portable apparatus of this type, it is most desirable to have single elements perform two or more functions since such characteristics decrease complexity, weight and cost.

The invention further discloses improved means for insuring constant speed of the tape drive. Thus, the apparatus includes a governor which includes a regulating brake of such design that mechanical irregularities are minimized, notwithstanding any positioning of the instrument and the fact that substantially no flywheel is required or used for contributing to the constancy of the speed.

The invention will be further understood from the following description and drawings in which.

Figures 1, 2:
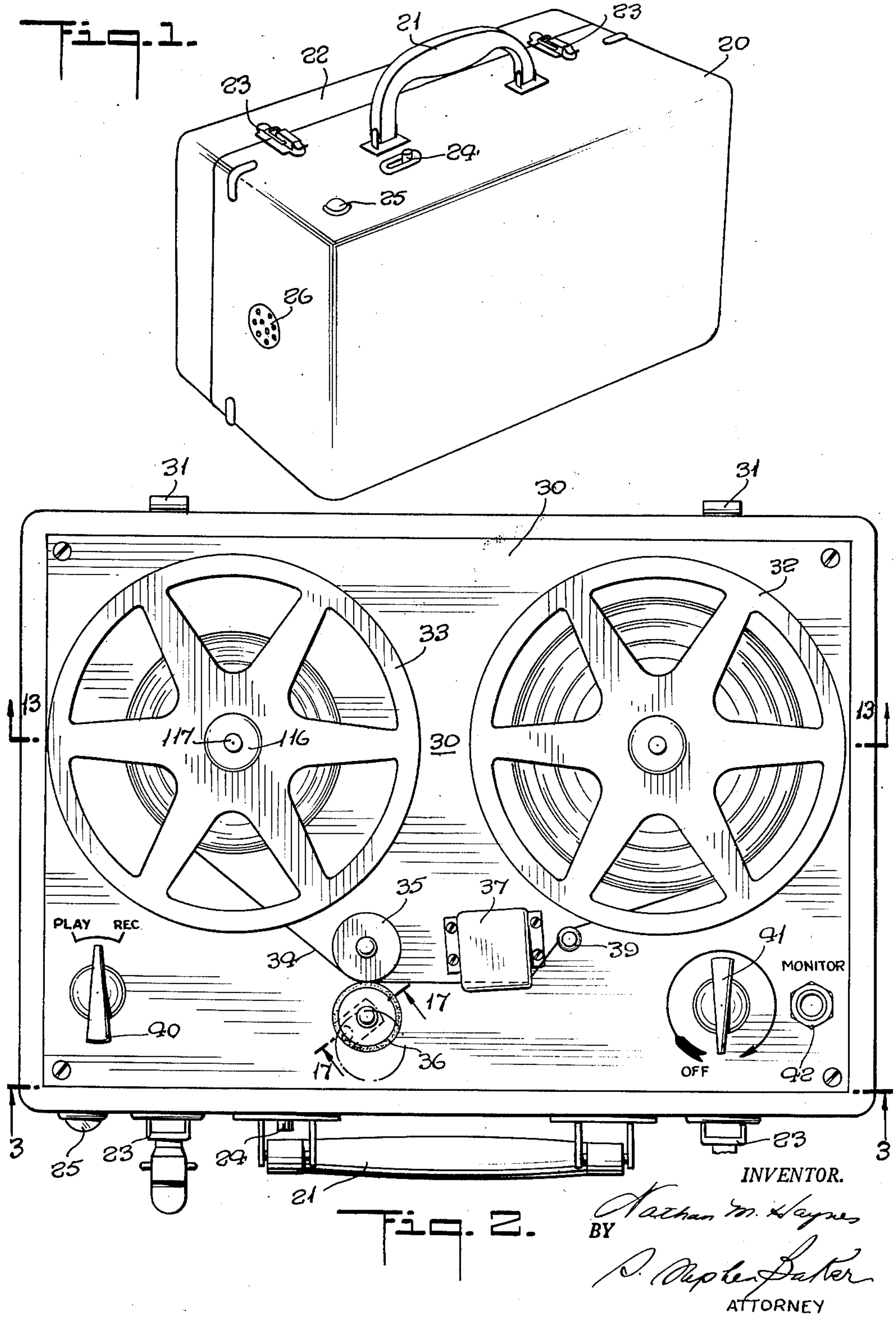
Figure 1 is a perspective view of the apparatus including its carrying case.
Figure 2 is an enlarged plan view of the top operating panel of the apparatus, the cover of the case having been removed.
Figure 3:
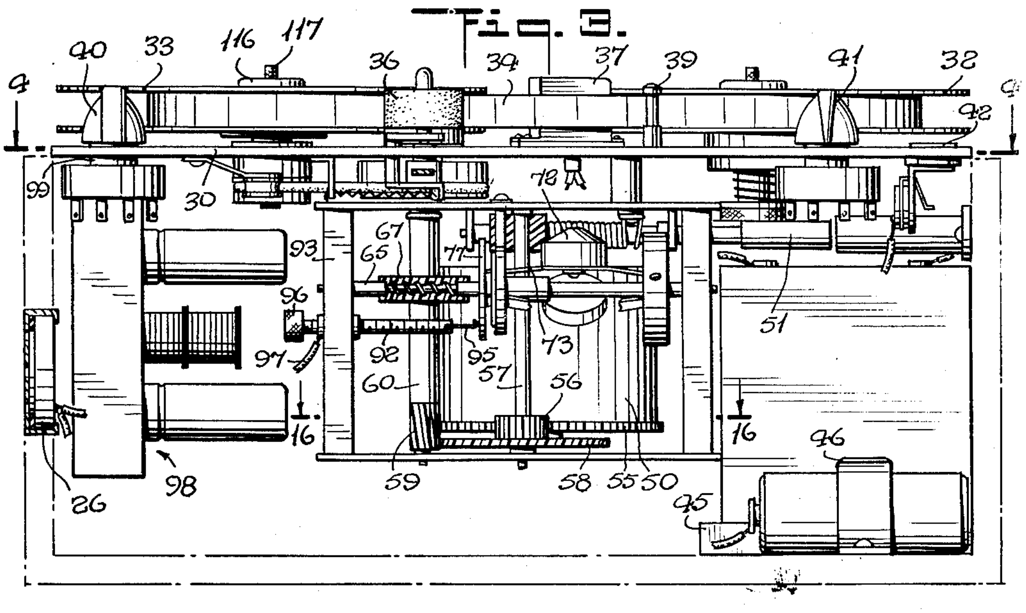
Figure 3 is a side elevational view, the side of the case having been removed, the view being taken along the lines 3—3 of Figure 2.
Figure 4:
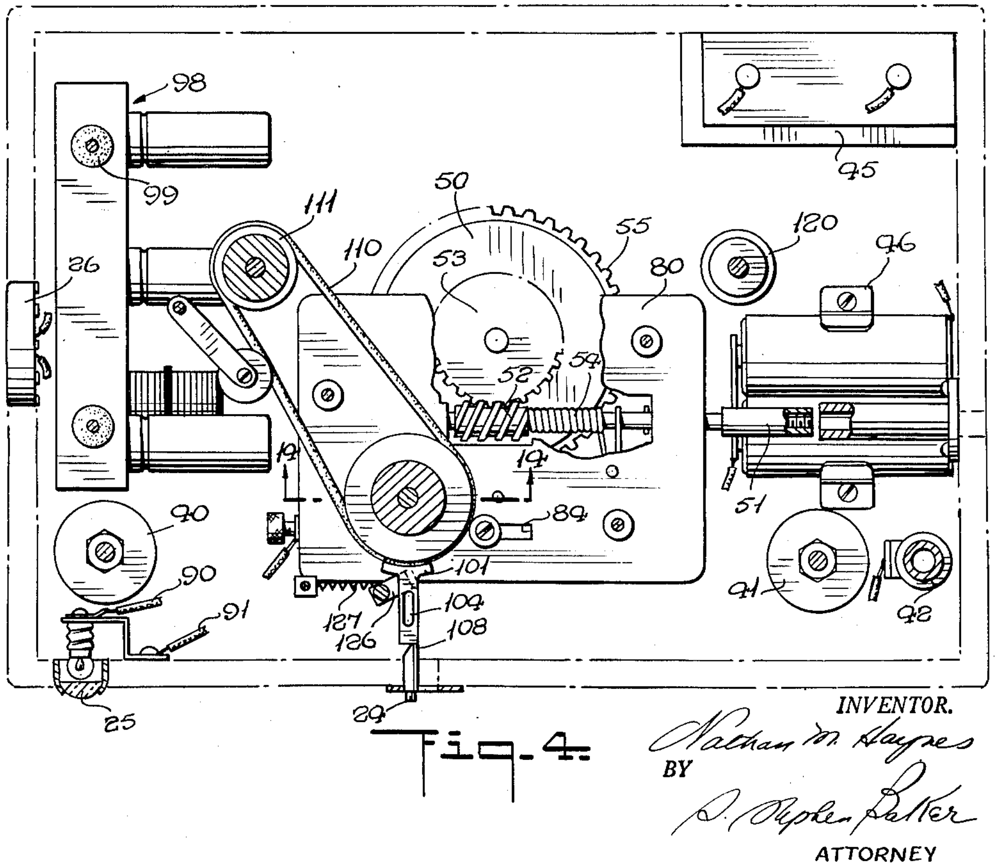
Figure 4 is a top view of the operating openings as taken along the lines 4—4 of Figure 3 and partly broken away.
Figure 5:
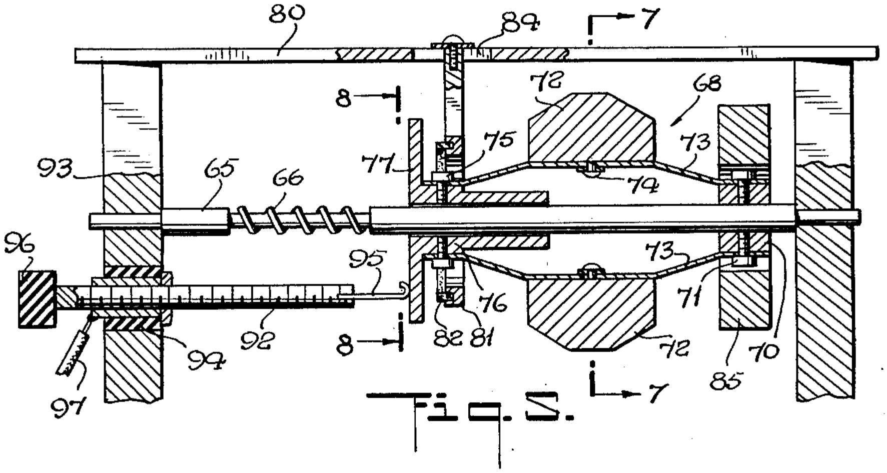
Figure 5 is a cross-sectional view of the governor and associated parts thereof when the motor is not in operation.
Figure 6:
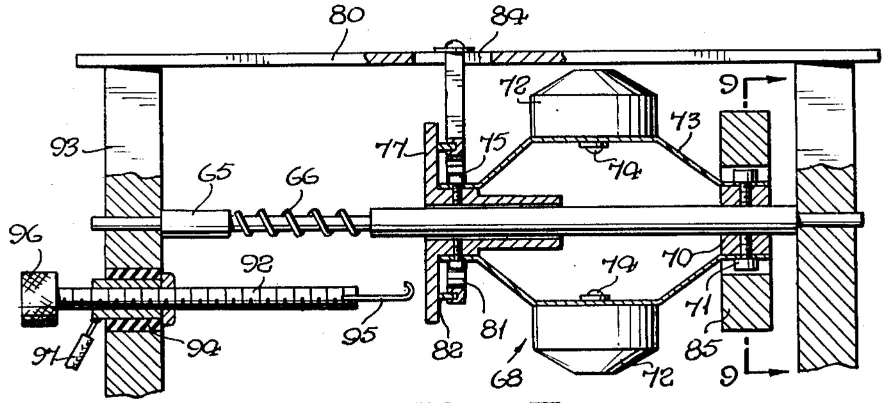
Figure 6 is a view similar to Figure 5 but showing the parts when the motor is in operation.
Figures 7, 8, 9:
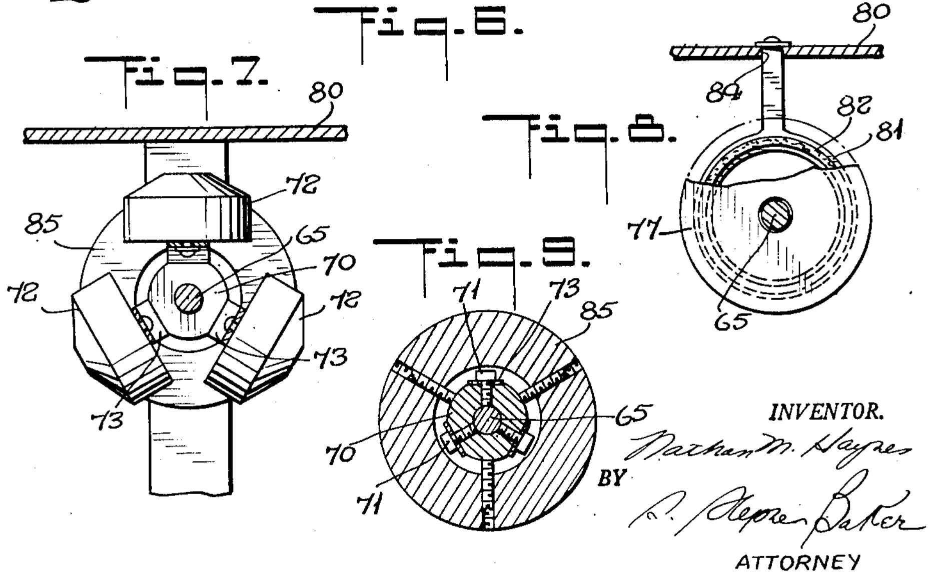
Figure 7 is a cross-sectional view as taken along the lines 7—7 of Figure 5.
Figure 8 is a front view of the brake disk partly broken away and taken along the lines 8—8 of Figure 5.
Figure 9 is a cross-sectional view as taken along the lines 9—9 of Figure 6.
Figure 13:
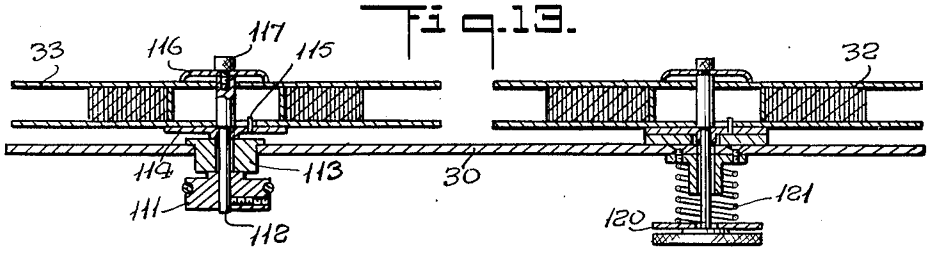
Figure 13 is a cross-sectional view as taken along the lines 13—13 of Figure 2.

Referring to Figure 1, the apparatus is provided with a housing in the form of case 20 which may resemble a small travelling case. The case is provided with a conventional type of carrying handle 21 and a cover 22 which is held to the body as by latches 23. To the right of the handle 21 and forwardly thereof is disposed the brake control post 24 so that it may be conveniently operated by the thumb of the user while his hand grasps the handle 21. The case further includes an indicator or pilot light 25 as well as a microphone 26 set in the forward end of the case.

The top or operating panel 30 of the apparatus is shown in Figure 2, the cover 22 having been removed from the hinges 31. A supply reel 32 is rotatably mounted on the panel 30 as is a driven take-up reel 33. The magnetic tape 34 is adapted to be recorded upon or played back as it travels from reel 32 to reel 33. The tape is driven by means of capstan 35, a spring actuated pressure wheel 36 normally pressing the tape against the capstan. In its movement, the tape is drawn across the face of the recording or reproducing head 37, guided by a post 39.

Panel 30 also supports the control knobs or switches such as switch 40 which prepares head 37 and the amplifier for either playing or recording, as will be evident to those skilled in the art. Such action is conventional and need not be illustrated or described in any detail. Switch 41 comprises the conventional on-off and volume control switch while a jack 42 may serve as monitoring means for receiving the plug of a set of earphones or the like.

The apparatus of the instant invention drives the tape through a spring wound motor while the amplifier is powered by means of dry batteries. The usual 2 volt cells for heating the tube filaments and a higher volt battery for the plate supply are provided. The high voltage battery may be seated in compartment 45 while the 2 volt cells may be enclosed by brackets 46.

The spring motor 50 may take any desired form. In the form shown, it includes an internally threaded winding shaft 51 which is adapted to be engaged by a suitable handle, not shown, which engages its threads. To the end of shaft 51 is secured a worm gear 52 which engages gear 53 for winding up the motor. A spring 54 is provided to maintain the worm gear in proper position relative to gear 53.

It is evident that the internal mechanism of the spring motor 50 need not be described, it being sufficient to point out that the output force of the spring motor is transmitted through gear 55 to a pinion gear 56 which is keyed to shaft 57. Likewise keyed to shaft 57 is the larger gear 58, the beveled teeth of which engage the worm teeth 59 to drive shaft 60. Shaft 60 drives the capstan 35 which actuates the tape as was above explained.

It will be understood from the foregoing that some form of control is necessary for regulating the speed of the spring motor as otherwise its power would be dissipated in one burst. Accordingly, a centrifugal form of governor is provided which governs or regulates the speed of the motor by applying a braking action thereto when the speed tends to become excessive. The governor shaft 65 has worm teeth 66 and is driven thereby by means of a fiber gear 67 which is keyed to drive shaft 60. The governor shaft 65, the governor 68 itself, and its associated parts are best shown in Figures 5 to 9.

The action of the governor 68 is to apply a retarding force on the shaft 65 which is, of course, transmitted to the drive shaft 60 and thence to the spring motor through the gearing described. The construction of the governor although broadly conventional, has been modified or improved to a considerable degree so as to better adapt it for the purposes of actuating the tape drive mechanism with the required precision.

The governor comprises a fixed collar 70 which is secured to governor shaft 65 as by the bolts 71. Three weights 72 are connected to the collar 70 by leaf springs 73. Springs 73 are thin, flexible, resilient spring strips secured to collar 70 by the above mentioned bolt 71 and to the weight 72 by bolts 74. Springs 73 further extend along shaft 65 and are connected by bolts 75 to a slidable collar 76 of the friction wheel or drum 77. Wheel 77 is loosely and slidably supported over shaft 75, the action of the governor being to slide the wheel 75 as is conventional in such governor mechanisms.

It will be recognized that the connection of collar 70 to shaft 65 is such as to effect the rotation of the governor mechanism as the shaft 65 is rotated by the main drive shaft 60. Pursuant to the action of such governors, the bolts or weights 72 are thrown outwardly by centrifugal force through rotation of the shaft 65. The springs 73 then draw the brake wheel or drum 77 inwardly from the position shown in Figure 5 to that shown in Figure 6.

The spring motor and governor mechanism is provided with a frame housing including a top plate 80 from which is suspended a circular brake shoe 81. Brake shoe 81 is provided with an annular groove within which is disposed suitable brake lining material in the form of an annulus 82, this annular brake lining extending outwardly of the shoe 81.

The periphery of annular brake lining 82 bears against wheel 77 so as to apply a braking action thereto. It will be apparent that notwithshtanding the slidable or loose fit of wheel 77 on shaft 65, the action of applying a braking force to the wheel is to correspondingly retard the rotation of shaft 65 through the leaf springs and collar 70, which in turn imposes such a load on the drive shaft 60 as to slow up the rotation thereof and thus control the speed of the capstan or tape drive member. By such governing action, the drive shaft 60 may be regulated to a speed of about 1½'' per second, up to any reasonably desired speed depending upon the quality or fidelity or reproduction, which is desired. It will further be observed that the brake shoe 81 is disposed within a slot 84 in top plate 80 which permits a degree of adjustment of the shoe 81 for predetermining the desired speed. It will be evident that if the shoe 81 is moved to the right, for example, from the position illustrated in Figure 6, a greater speed will be permitted and achieved in that the wheel 77 will have to be drawn further to the right before the governor braking action takes effect.

I have determined that the brake shoe 81 should preferably, but not necessarily, be constructed in the substantially annular form shown in order to avoid any tilting or skewing action on wheel 77. The annular nature of the brake lining groove and brake lining material 82 is such as to apply an evenly distributed pressure on wheel or drum 77. This is important in eliminating or avoiding irregularities in operation, which as above mentioned, are of critical significance in tape drive mechanisms. It will be recognized, of course, that the annular groove of shoe 81 may be interrupted to provide separated or spaced contact points as long as the contact points are not limited to one which might unbalance the wheel 77. It may further be observed that the weights 72 should be greater than ordinarly encountered in governor mechanisms of this type, a weight of at least 35 grams for each ball having been found satisfactory for providing the torque required. I have further taken advantage of the presence of collar 70 for mounting a small flywheel 85 on shaft 65 but such flywheel is by no means essential to the smoothness of rotation of shaft 65 or shaft 60.

The instant application also discloses an indicator light having a plurality of functions. The indicator light 25 is energized and lighted through the wires 90 and 91 which are connected to the low voltage batteries as will hereinafter be described. Thus, wire 90 is connected to one terminal of the battery, the other terminal of which may be grounded. Accordingly, if wire 91 is connected to ground the indicator 25 will light, assuming the circuit is otherwise closed. In order to produce such lighting of indicator 25, a threaded shaft 92 is disposed in a column 93 of the spring motor and governor mechanism frame housing. Electrical insulating material 94 insulates the shaft 92 from the frame housing which may be electrically grounded. A contact arm 95 is connected to shaft 92. It will be recognized that if wheel 77 effects contact with arm 95, then indicator 25 will light up as above described if the circuit is otherwise closed. Such contact arm 95 is effected when wheel 77 is at or approaching its normal position, i. e., when uninfluenced by the centrifugal action of weights 72. A head 96 serves to adjust the lateral position of shaft 92 so that the indication may take effect when desired.

Wire 91 is connected to wire 97 through the amplifier on-off switch 41 so that the circuit to the amplifier unit 98 is open when switch 41 is off. Of course, it is also open if arm 95 does not meet wheel 77. When, however, the switch 41 is first turned on, the control post 24 will be in its initial braking position so that the motor is not turning and the governor is in its normal position. The apparatus will then be in a position shown in Figure 5 where the wheel 77 is in contact with arm 95 and indicator 25 will be lit up to show that the amplifier is on and ready for recording. However, it should be understood that recording should not be commenced until proper operating speed has been attained. This is indicated as follows:

When the brake control post 24 is actuated by the user so as to release the brake on shaft 60, the governor will begin to rotate and soon will withdraw wheel 77 from arm 95. This will disclose to the user that the mechanism has reached proper operating speed since at this time the indicator light will be extinguished. Now, the spring motor will function so as to rotate the shaft 60 and reel 33 at the proper speed.

Assuming now that the spring motor becomes unwound and requires rewinding, the wheel 77 will gradually move to the left so as to effect contact with arm 95. It has been found to be preferable, although not necessary, to make a rear face of wheel 77 irregular so that as it retracts to normal position, it first effects intermittent contact with arm 95 and then makes full and constant contact therewith. By this means, when the spring motor is becoming unwound, the light 25 will first begin to flicker and will then go on continuously. This will show that there is no more power left in the spring motor and the tape drive will therefore cease. When the light begins to flicker, the operator should rewind the motor so that any further conversation or other subject will not be lost. It has been found that by employing the motor described in the instant application, the tape drive may continue for fifteen minutes or longer at each winding.

As has been above pointed out, the recorder of the instant invention is capable of operation in substantially any position. The amplifier unit 98 is shock mounted in the housing as by rubber grommets 99 and assumes conventional form in respect to its construction and operation. The particular governor action is employed because it operates independently of position. In addition, the take up and supply reels are likewise mounted and operated so as to be independent of position.

The brake control on shaft 60 which commences the operation of the recorder will now be described. On drive shaft 60 is mounted a wheel 100 which serves both as a pulley and a brake drum. Considering first its function as a brake drum, it serves to arrest and stop the rotation of drive shaft 60 when contacted by brake shoe 101. Brake shoe 101 is mounted on the brake angle arm 102 which is slidably supported by bolts 103 operating in slot 104. Spring 105 normally maintains the brake shoe 101 out of contact with wheel 100. Accordingly, unless arm 102 is pressed inwardly, the drive shaft will rotate so as to actuate the tape and take up reel.

Figures 10, 11, 12, 14, 15, 16, 17:
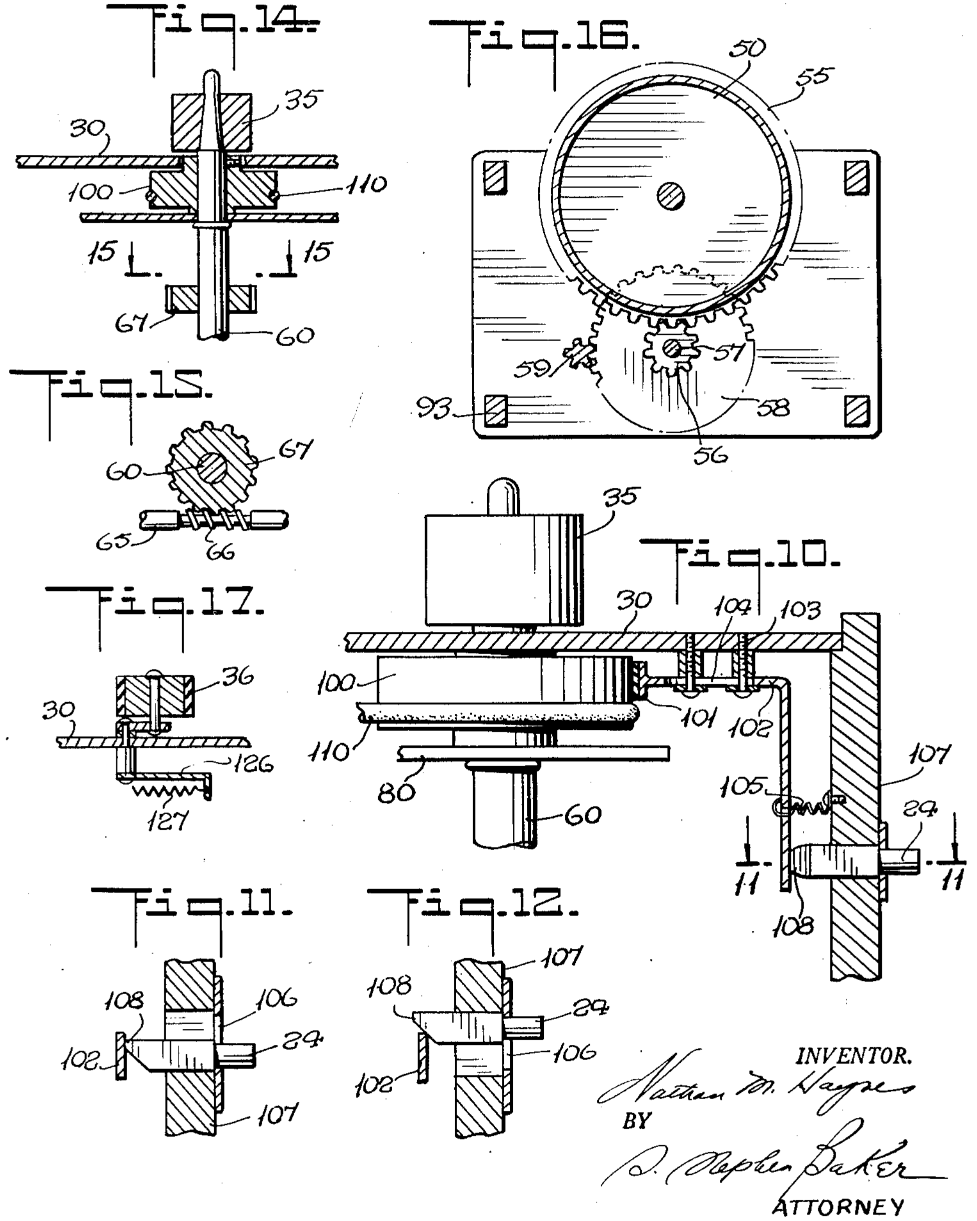
Figure 10 is a fragmentary view illustrating the motor brake and its external control post.
Figure 11 is an enlarged fragmentary view illustrating the brake control post in its position of applying the brake.
Figure 12 is a view similar to Figure 11 with the brake control post adjusted so as to permit operation of the motor and driving of the tape.
Figure 14 is a cross-sectional view as taken along the lines 14—14 of Figure 4.
Figure 15 is a view taken along the lines 15—15 of Figure 14.
Figure 16 is a view taken along the lines 16—16 of Figure 3.
Figure 17 is a cross-sectional view as taken along the lines 17—17 of Figure 2.

The brake control post 24 serves to control the brake arm 102 so as to apply or release the brake. Control post 24 is slidably disposed in slot 106 in the top face 107 of the case 20. Post 24 is formed with a slanted or bevelled leading end 108 which effects operating contact with arm 102. Thus, when post 24 is actuated to one extremity of slot 106 as illustrated in Figure 11, the arm 102 will be urged inwardly against the action of spring 105 so as to apply the brake to wheel 100. On the other hand, when post 24 is slid in the opposite direction as illustrated in Figure 12, the arm 102 will be drawn by spring 105 out of engagement with wheel 100 and shaft 65 may be rotated by the spring motor.

It will be noted that reel 33 functions as a take-up reel and is driven by the spring motor for this purpose. The transmission of power is effected through wheel 100 which serves as a pulley and is mounted on drive shaft 60. A belt 110 is driven by pulley 100 and is connected to hub 111 which is secured to the take-up reel shaft 112. Shaft 112 extends and operates through a bearing member 113 in panel 30. Shaft 112 is formed with a plate 114 having a pin 115 which engages an opening in reel 33 so as to key the reel to the shaft. Shaft 112 continues upwardly through the central opening of reel 33 where a spring washer 116 and a knuried nut 117 firmly secure the reel against accidental displacement. Actuation of pulley 110 thus effects suitable rotation of reel 33 which then functions to take up any tape which passes the capstan.

Reel 32 is rotatably connected to panel 30 in essentially the same manner as that of reel 33 save that a clutch mechanism 120 including a spring 121 is provided. Clutch 120 comprises a slipping clutch which provides the necessary resistance to maintain the tape at the right tension regardless of how much tape is on the reel 32. The particular slipping clutch employed may follow that described in my application Serial Number 182,809, filed September 1, 1950.

It will be understood that the tape is driven at a controlled speed by means of the capstan 35.

In order to stabilize and assure such controlled speed, a pressure wheel 36 is urged against the capstan by means of pivoted linkage 126, the normal position of such linkage and pressure wheel being against the capstan as urged by spring 127. Pressure wheel 36 is provided with an outer rubber sleeve as is conventional.

Briefly, the apparatus of the instant invention may be operated as follows:

In order to make a recording, the tape will first be disposed on supply reel 32 and switch 40 will be turned to recording position. The on-off switch 41 will then be turned to the proper volume and indicator 25 will light. The amplifier will thereupon heat up to operating condition. If the motor has not been wound it may now be wound by rotating the internally threaded winding shaft 51.

The brake control post 24 will then be actuated to release the brake 101 and the spring motor will then drive shaft 65 as controlled by the governor mechanism. It will be obvious that the brake control post 24 need not be on the outside of the apparatus but may be disposed on the operating panel if desired. As the tape is driven past the head 37, it will be recorded upon by the sound waves entering microphone 26 which are applied to the amplifier unit 98 and thence to the recording head in a conventional manner. The user may employ the monitor plug 42 for monitoring the recording as above explained. At the end of the recording, the brake 101 is applied.

When it is desired to play back the recording, the switch 40 is turned to "play," the pressure wheel 36 is retracted against the action of spring 127 and reel 32 is reversely rotated manually so as to return the tape to the supply reel. Thereafter, the brake is released from drive shaft 69 to commence such play-back. During either recording or play-back, the indicator light 25 will not only indicate whether the amplifier is first turned on and when proper operating speed has been attained, but will also warn the user that the spring motor must be rewound as above described.

The microphone 26 has been illustrated as being disposed in the front wall of the rectangular and slightly elongated case 20 in order that a recording may be made while a user is holding handle 21 which is parallel to the longitudinal axis of the rectangular case and while his thumb is conveniently available for actuating brake control post 24 without requiring or evidencing undue movement of his hand for this purpose. Post 24, it will be observed, is to the left and forwardly of the handle to facilitate such actuation by the thumb. Thus, during the normal carrying of the case, the microphone will be properly oriented for receiving the subject to be recorded and all the user need do is actuate the post 24 assuming, of course, that the switch 40 is on "record" and switch 41 is on. Apart from this particular disposition of the microphone and brake control post 24 which permits recordings to be made without the knowledge of the person being recorded, it will be understood that the microphone may take conventional forms if this feature is not desired. Thus, the output of a microphone may be fed to the amplifier through a plug on the panel as is conventional.

It will be understood from the foregoing that the apparatus is securely disposed and maintained in the case 20 regardless of any orientation or positioning of the case. Even if the case were to be held upside down, all the parts above described will nevertheless operate since they are independent of any positioning including, of course, the action of the governor, the spring motor and the mounting of the reels and the amplifier unit. As a result, the apparatus may be held by its handle 21 while a conversation is going on or while a statement is being made by a subject being recorded and, though the reels might be turned 90° from what may be considered their normal position, the device will nevertheless operate in the manner above described. If any further secrecy is desired, it is, of course, possible to remove the indicator 25 to an inside position so that may not be evident when the case is closed. Furthermore, the microphone 26 may be concealed as by screening material in a manner well understood in the art.

What is claimed is:

1. A portable tape recording apparatus comprising a housing including an amplifier unit, a pair of rotatable reels, a spring motor, a first shaft driven by said spring motor, a capstan driven by said first shaft for actuating magnetic tape from one reel to the other, a pulley on said first shaft, a belt on said pulley and connected to said other reel for driving it together with said capstan, a second shaft driven by said spring motor, a centrifugal governor on said second shaft for regulating the speed thereof, and a gear connecting said shafts so as to regulate the speed of the capstan.

2. An apparatus according to claim 1 and wherein said pulley also functions as a brake drum for arresting operation of said shaft, a brake shoe for effecting braking action with said pulley, an angle arm connected to said brake shoe, one portion of said arm being slidably supported relative to said pulley and the other portion of said arm perpendicularly depending from said one portion, a spring connected to said other portion of said arm for normally urging said brake shoe out of contact with said pulley and a slidable brake control post for acting against said other portion of said brake arm against the action of said spring, said brake control post having a bevelled operating edge for actuating said other portion of said brake arm as said brake control post is slid.

3. A portable tape recording apparatus comprising a housing including an amplifier unit, a pair of rotatable reels, a spring motor, a first shaft driven by said spring motor, a capstan driven by said first shaft for actuating magnetic tape from one reel to the other, means to drive one of said reels so as to take up the actuated tape, a second shaft driven by said spring motor, a centrifugal governor on said second shaft for regulating the speed thereof and a gear connecting said shafts so as to regulate the speed of the capstan.

References Cited in the file of this patent

UNITED STATES PATENTS

| Number | Name | Date |
|---|---|---|
| 1,136,739 | Tiffany | Apr. 20, 1915 |
| 2,442,887 | Buemete | June 8, 1948 |
| 2,609,457 | Thurm | Sept. 2, 1952 |
| 2,616,982 | Gray | Nov. 4, 1952 |

FOREIGN PATENTS

| Number | Country | Date |
|---|---|---|
| 567,152 | Great Britain | Jan. 31, 1945 |